June 19, 1956  C. L. ISBORN  2,751,584
VISUAL READOUT DEVICE
Filed Nov. 10, 1953  3 Sheets-Sheet 1
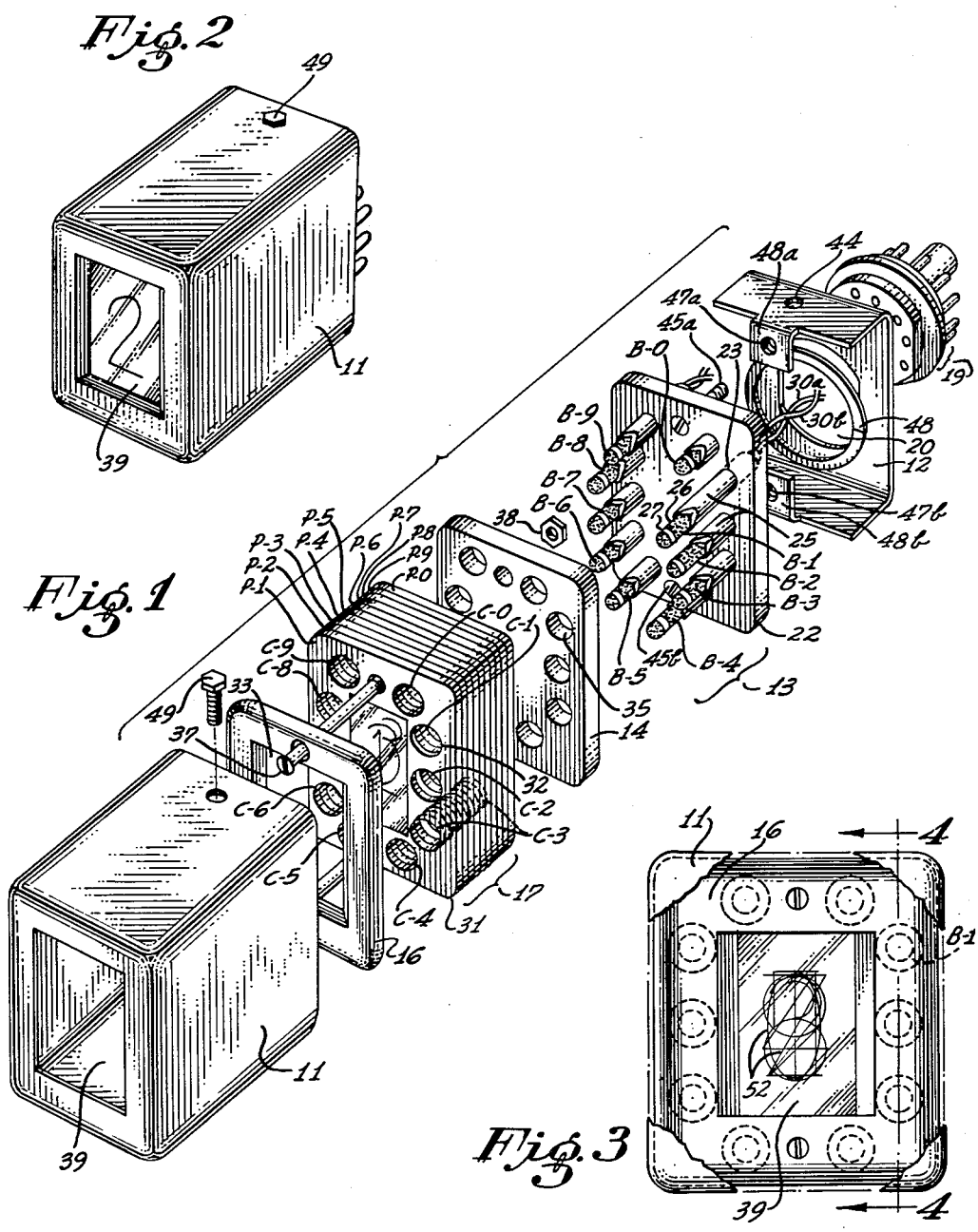

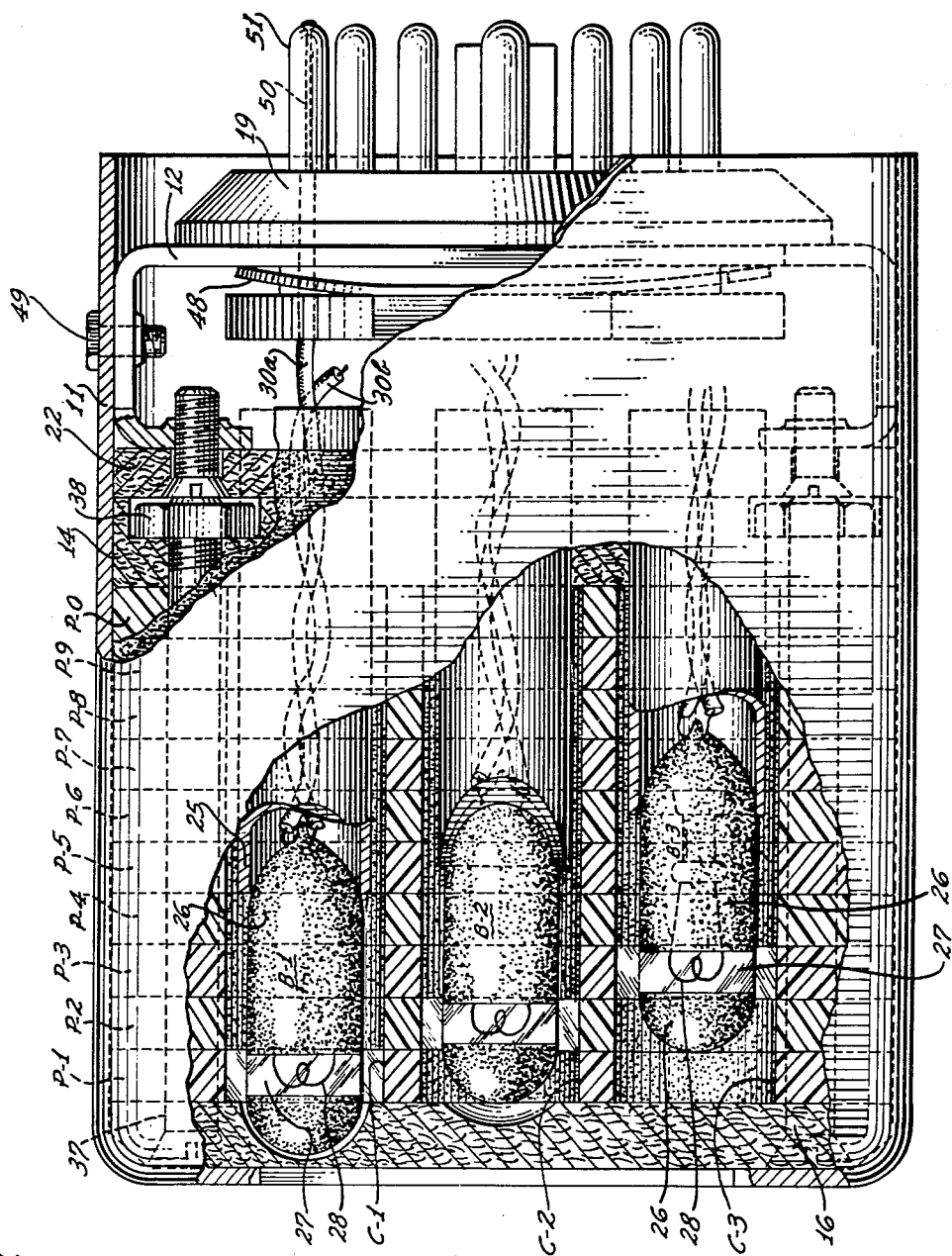

June 19, 1956
C. L. ISBORN
2,751,584
VISUAL READOUT DEVICE
Filed Nov. 10, 1953
3 Sheets-Sheet 3
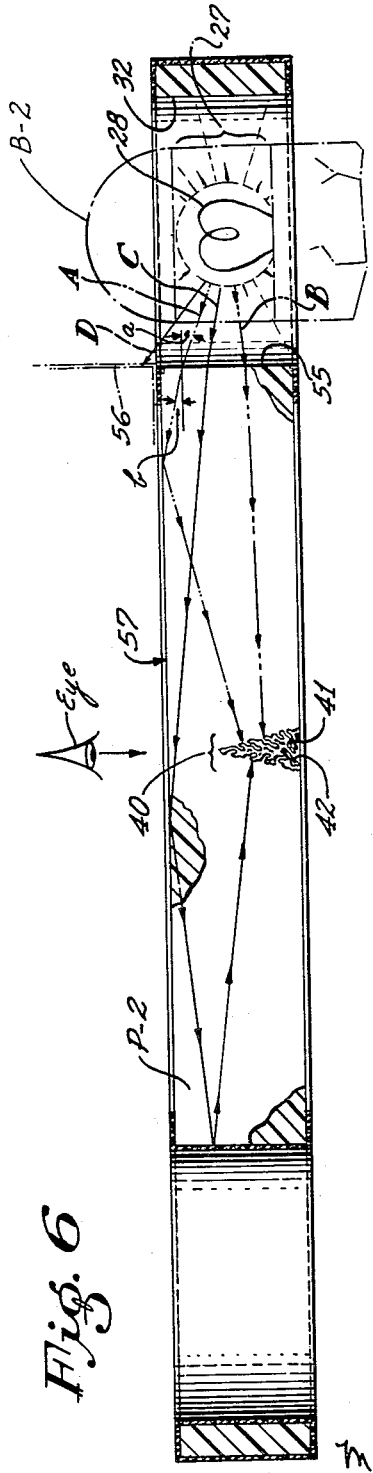
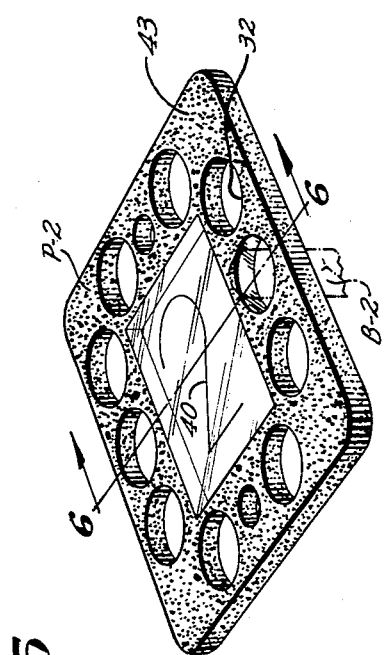
Fig. 5
Fig. 6
INVENTOR:
Carl L. Isborn
Mason, Mason & Shrider
Patent Attorneys

United States Patent Office 2,751,584
Patented June 19, 1956

2,751,584

VISUAL READOUT DEVICE

Carl L. Isborn, Hawthorne, Calif., assignor, by mesne assignments, to The National Cash Register Company, a corporation of Maryland Application November 10, 1953, Serial No. 391,262

6 Claims. (Cl. 340—380)

This invention relates to visual readout devices and more particularly to novel means for rendering visible a selected one from among a number of normally invisible superposed symbols.

In the computer art, for example, it is highly desirable to have means for visually indicating through a viewing window any of the decimal digits 0 to 9, and at the same time have each digit, as selected, be located in the same relative area. Furthermore, in order to be able to operate with fast-acting electronic equipment, it is advantageous to have these digits controlled so that they appear and disappear at the window without the necessity of any mechanical motion.

Briefly, the present invention provides a novel arrangement for directing light into the interior of one of a plurality of thin transparent plates lying in face-to-face relationship to form a stack or pack. The plates are made of acrylic resin or a similar material having a high index of refraction. Each of the plates has the outline of a symbol scratched or scribed on its rear surface. The light from one of a plurality of light sources is so directed into each of the thin plates that it can only escape through the rough crystalline surface of the scribed outline, thus rendering this symbol visible when viewed from the window at the front of the stack, to the exclusion of all the other symbols.

One of the objects of this invention is the provision of an improved construction of this character which is economical in manufacture and highly efficient in use.

Another object of this invention is to provide a simple method of forming the outlines of the symbols on the plates so as to enhance their ability to be illuminated.

Another object of this invention is to provide a novel arrangement for directing light from electric bulbs into each of a plurality of thin plates, stacked in face-to-face relationship, so as to render visible the outline of a symbol thereon.

Still another object of this invention is to provide a simple, sturdy, compact readout device for visually indicating outlines of decimal digits in response to electrical signals.

Other objects and features of the invention relating particularly to details of construction and arrangement of parts will become apparent from the following description read in conjunction with the accompanying drawings in which:

Fig. 1 is an exploded view of a readout unit embodying the invention.

Fig. 2 is an assembled view of the unit.

Fig. 3 is a front view with the frame partially cut away.

Fig. 4 is a partially vertical section of the unit taken on the line 4—4 of Fig. 3.

Fig. 5 is a perspective view of a typical plate bearing the symbol "2."

Fig. 6 is a transverse section of a plate taken on the line 6—6 of Fig. 5.

The design and construction of the novel readout device can best be understood from the exploded view of the unit shown in Fig. 1. The readout device comprises a box-like housing 11 and a detachable rear wall 12 formed of sheet metal. Disposed within housing 11 is a bulb mount 13 and a spacer 14 formed of sheet phenolic or the like, a stack 17 of ten plates of acrylic resin (Lucite) or the like, and a mask 16 also of sheet phenolic or the like. A suitable eleven prong electrical plug 19, positioned in an opening 20 in the rear wall 12 of the housing 11, completes the assembly.

The bulb mount 13 includes a base 22 formed of a rectangular sheet of phenolic with ten holes, such as hole 23, spaced around the outer portion of its surface. These holes are drilled of a diameter to provide a friction fit for the ends of ten tubular supports of phenolic material, such as tubular support 25. The ten tubular supports, each of which is a different length, are thus fixed in a normal position with respect to the surface of base 22. One of ten elongated incandescent bulbs, B-1 to B-0, inclusive, is cemented to each of the protruding ends of the ten tubular supports. The end of bulb B-1, from which its leads are taken, is cemented to the end of the longest tubular support 25 such that the longitudinal axis of the bulb is in line with the axis of the tubular support, as shown; and bulbs B-2, B-3, etc. are similarly cemented to the ends of the progressively shorter length tubular supports fixed in the successive clockwise positions in the view shown. The glass surface of each of the bulbs, such as bulb B-1, is coated with a silver paint 26 except for a narrow band 27 surrounding its filament 28 (see Fig. 4). The two electrical leads from each incandescent bulb, such as leads 30a, 30b from bulb B-1, extend through the hollow center of tubular support 25 to the back of base 22 of the bulb mount 13.

The stack 17 of ten thin transparent acrylic resin plates P-1 to P-0, inclusive, is arranged so that the plates lie in face-to-face relationship. Each of the plates is of the same rectangular shape with rounded corners 31. The outer portion of the surface of each plate has ten holes, such as hole 32, arranged therearound similar to the spacing of the ten holes 23 in the base 22 of the bulb mount 13. When stacked together, similarly positioned holes 32 in the plates P-1 to P-0, inclusive, are all aligned such that the openings or holes, running the entire length of the stack 17, form columns designated C-1, C-2, C-3, etc. The edges of each of the plates as well as the edges of its holes 32 are formed perpendicular to the surface of the plate so that they can be used to properly direct light rays in the manner to be hereafter described.

The stack 17 of plates is assembled with the mask 16 positioned on the face of its foremost plate P-1 and the spacer 14 positioned on the back of its rearmost plate P-0. The phenolic spacer 14 has the same rectangular shape as the plates in stack 17. It likewise has ten holes, such as hole 35, arranged around the outer portion of its surface. These holes are aligned with the similarly positioned holes 23 in the base 22 of the bulb mount 13. The border of the phenolic mask 16 covers up the front surface of the stack of plates to a point inward from where the holes 32 are located, leaving a rectangular opening 33 through which the central area of the plates of the stack 17 can be viewed.

Additional aligned holes at the top and bottom of the mask 16, stack 17, and spacer 14 are provided for receiving clamping bolts, such as bolt 37, which together with nut 38 engaging the threaded end thereof firmly holds the member together.

In assembly, this unit is then positioned with the columns of holes C-1, C-2, etc. in the stack 17 aligned with the tubular supports 25 of the bulb mount 13 such that when brought together the back surface of the spacer 14 lies against the front surface of the base 22.

As previously described, the tubular supports 25 are of different length such that, when introduced into the stack 17, bulb B-1 protrudes the furthest into the column of holes C-1, while bulbs B-2, B-3, etc. protrude progressively lesser amounts into the columns of holes C-2, C-3, etc., respectively.

This can be more clearly seen in Fig. 4 which shows a partically vertical cross-sectional view taken through the columns of holes at the right side of the readout device as shown in Fig. 3. For example, the bulb B-1 is held by its tubular support 25 in the column of holes C-1 such that the uncoated band 27 around the bulb B-1 will be even with the edge of one of the holes 32 in the plate P-1. Similarly bulb B-2 is held by its tubular support in the column of holes C-2 such that its clear band 27 will be even with the edge of one of the holes 32 in the P-2 plate. Progressing around the base 22 in a clockwise direction, the tubular supports 25 get progressively shorter until the shortest tubular support positions the clear band 27 of bulb B-0 in column of holes C-0 even with the edge of one of the holes 32 in plate P-0.

The only light transmissive edged hole of the column of holes C-1 in which bulb B-1 is positioned is the hole in plate P-1, thus permitting light from bulb B-1 to be directed into the interior of plate P-1. In a similar manner, the hole in plate P-2 is the only light transmissive edged hole of the column of holes C-2 of the stack in which bulb B-2 is positioned, thus permitting light from bulb B-2 to be directed into the interior of plate P-2. Thus, in each of the column of holes, the edge of a hole of a different plate, at which position in the column a bulb is located, is likewise transparent.

One method by which the holes of the plates may be coated so that the edge of only one of them is transparent, as above described, may be better understood by reference to Fig. 5 which is a perspective view of plate P-2 removed from the stack. First, the four edges of each of the plates may be dipped, for example, into silver paint such that the border 43 of its lateral surface is immersed to a depth forming the boundary of the area on which the outline of the symbols of the digits appear. In this way the edges of all the holes 32 of the plate are coated. Depending on its position in the stack 17, one of the holes 32 in each of the plates is then reamed clear and polished so as to provide a highly transparent path for the light rays directed therein. It should be understood that, in order to properly control the light, the silver paint coating is needed only on the outer edges of each plate and the inner edges of its remaining nine holes. The coating on the border of the lateral surfaces of the plates is of no avail in controlling the light rays but it does no harm and thus need not be removed.

The outlines of the decimal digits 1 to 0, inclusive, are scribed on the back surface of the plates so as to be centrally located within the area viewed through the window 39 at the front of the housing 11. These lines are scribed, for example, by a diamond tip stylus, utilizing sufficient pressure to obtain a crystallized, irregular walled V-groove 40 as shown in Fig. 6, which is an enlarged transverse section of plate P-2 taken on line 6—6 of Fig. 5. As a result of the scratch made in this manner, some of the resin material is caused to form crystalline curls 41 whose ends are attached to the wall of the groove, while other of the curls, such as 42, are relatively free but retained in the groove by the other curls. The outline of one of the ten decimal digits 1 to 0 is scratched in this manner on each of the ten plates P-1 to P-0, respectively.

The entire lighting assembly comprising the bulb mount 13 and the stack 17 is attached to the rear wall 12 of the housing 11 by screws 45a and 45b passing through holes in the top and bottom of the base 22 and threaded into tapped holes 47a and 47b provided on inwardly directed flaps 48a and 48b, respectively, of the rear wall 12. As may be better seen in Fig. 4, the ends of the electrical leads from each of the bulbs, such as leads 30a and 30b from bulb B-1, are inserted into the hollow center of the prongs 51 of the plug 19 to which they are then soldered. The plug 51 is firmly held in the opening 20 of the rear wall 12 by a ring spring 48. The unit so far assembled is next inserted into housing 11 and secured there by a screw 49 passing through a hole in the top of the housing to engage the threaded hole 44 on the rear wall 12.

From the front of the unit as finally assembled, the observer views the digit-bearing areas of the stack 17 through the rectangular window 39 of the housing 11 and the similar opening 33 of the mask 16. Since all the digit-bearing acrylic resin plates are transparent, the digit scratched on the back surface of each plate will be observable as faint lines through the intervening transparent plates. When none of the bulbs are energized, the outlines of all ten decimal digits will appear at the housing window 39 as a maze 52 of faint unintelligible lines, as shown in Fig. 3.

If, however, any one of the ten bulbs B-0 to B-9 is energized, introducing light into the interior of its associated digit-bearing plate, the trace of the digit scribed on the rear surface thereof becomes highly illuminated and becomes readily visible to the observer, when viewed from the front of the housing, to the exclusion of all the other digits; i. e., by contrast the illuminated digit effectively blanks out the faint scratches of the unilluminated digits. For example, if bulb B-2 is energized, light emitted from the clear band 27 around the bulb B-2 enters plate P-2 by way of the polished inner surface of its clear hole 32, causing the outline of digit 2 scribed on the rear face of the plate P-2 to become highly illuminated, and the digit will appear clearly visible in the housing window 39, as illustrated in Fig. 1.

In operation, the decimal digits are made to appear in the housing window 39 (Fig. 1) of the assembled visual readout unit by application of an electrical output potential from a counter, for example, to the prongs 51 of the electrical plug 19. Leads from the counter (not shown), representing digit potentials, are applied to corresponding digit prongs of the plug 19 while its remaining prong is grounded. Thus, for example, energizing the prong of the plug 19 which is connected to bulb B-2 causes this bulb to be energized, emitting light from its clear, uncoated band 27 through the clear edge of hole 32 in plate P-2 into the interior of the plate bearing the scribed outline of digit 2.

By reference to Fig. 6, the manner in which the light emitted by each incandescent bulb is introduced into a single symbol-bearing plate, confined therein, and caused to illuminate the decimal digit scribed on the rear face of the plate may be better understood. Fig. 6 is a transverse section of plate P-2 (Fig. 5) with the upper portion of bulb B-2 in normal position in the center of one of its holes 32 which forms a part of the column of holes C-2.

Light generated by the filament 28 is emitted in all directions within the glass envelope of bulb B-2, but all rays striking the inside of the bulb in the silver coated areas are reflected back into the glass envelope. The light rays are thus transmitted only through the area of the thin glass of the bulb envelope defined by the uncoated transparent band 27. The great majority of light rays passing through the transparent band 27 of the bulb envelope, such as light rays A, B, and C, are incident to the inner edge 55 of the hole 32 in plate P-2. A small minority of light rays, such as light ray D, leave the bulb envelope at sufficiently large angles with the normal to miss the inner edge 55 of the hole in the plate P-2 and strike the silvered inner edges 56 of the aligned holes in the adjacent plates. These rays are eventually reflected onto and absorbed by a black coating provided on the mask 16 and spacer 14 (Fig. 4).

The rays of light incident to the highly polished transparent surface, forming the edge 55 of hole 32, pass through into the interior of plate P-2. In passing from the lighter air medium with an index of refraction of unity, into the denser medium of the acrylic resin plate P-2 having an index of refraction of 1.49, the light rays are refracted towards the normal of the surface of edge 55, thus aiding the directing of the light rays into the interior of plate P-2. For example, the light ray A, having an angle of incidence "a" with respect to the normal, will form the smaller angle "b" with respect to the normal on passing into the plate P-2.

Some rays of light, such as ray B, will enter the interior of the plate through the edge 55 of hole 32 in such a direction as to strike directly on the sides of the digit outline 40 scribed on the plate P-2. Other rays, such as ray A, will first strike one of the transparent surfaces of the plate, such as upper surface 57, from whence they are reflected towards the sides of the scratched outline 40 of the digit. Still other rays, such as ray C, will strike the transparent surfaces of the plates, such as upper surface 57, at a sufficiently large incident angle so as to be reflected to the edge of one of the other holes 32 in the plate P-2, or the opposite outer edge of the plate P-2, from whence they are reflected by the silver coating on these areas back towards the scratched outline 40 in the central area of the plate P-2.

It should now be clear that light rays, once entering the interior of the plate, eventually strike the scratched outline 40 of the digit. There the light rays are highly diffused by the crystalline, irregular curls 41 and 42 so as to be split up into a multitude of rays which form a highly brilliant, white light when viewed from the front of the plate, as indicated. The illuminated digit is clearly visible through the intervening, transparent, non-illuminated plates and appears in the window 39 as depicted in Fig. 2. Because of the relatively high index of refraction of the acrylic resin plates, the illuminated symbol will appear to an observer as being approximately one-half its actual depth in the stack. To aid the visibility of the illuminated symbols, the central area of the spacer 14, which forms the background for the viewing window 39, may be covered with a flat black backing, such as black felt material.

It should be understood that the lighting arrangement shown and described enables very thin symbol bearing plates, assembled in a pack, to be selectively illuminated by standard type electric bulbs in a simple manner. Furthermore, the arrangement provides a novel compact manner of supporting and protecting the electric bulbs since they are, effectively, imbedded within the body of the stack of plates.

While the device as shown and described herein is admirably adapted to fulfill the objects and features of advantage previously enumerated as desirable, it is to be understood that the invention is not to be limited to these specific objects, but that the means and construction herein disclosed are susceptible of modification in form, proportion, and arrangement of parts without departing from the principle involved or sacrificing any of its advantages; and the invention is therefore claimed in embodiments of various forms, all coming within the scope of the claims which follow.

What is claimed is:

1. A visual readout device comprising a stack of thin transparent plates lying face to face, each of said plates having the outline of a symbol scribed on the same viewing surface thereof and a plurality of holes located in the outer portion thereof which are aligned with similar holes in the other plates; a reflective coating on the edges of all the holes of a plate except one; a plurality of electric bulbs; and means for supporting one of said bulbs in each of the aligned holes of said stack such that each bulb has its filament positioned in the uncoated hole of one of said plates.

2. An indicator comprising a stack of thin transparent plate-like members, each of said plates having a symbol scribed on the back surface thereof such that the groove formed is filled with crystalline curls; a plurality of electric bulbs, one for each of said members; and means positioning said bulbs within the body of said stack such that light rays from each bulb, when lit, are directed into one of said members and confined therein such that they can escape only through the groove whereat they are diffused so as to illuminate the symbol when viewed from the front of the stack.

3. A readout unit comprising a stack of substantially transparent plates, each of said plates having the outline of a symbol scribed on the back surface thereof, each of said plates further having holes in the outer portion of the surface thereof which are aligned with holes in the other plates; a plurality of bulbs, each having the surface thereof coated with a reflective material except for a clear band at the level of its filament; means for supporting one of said bulbs in each of the aligned holes of said stack such that the clear band of each is positioned at a different plate; and means capable of illuminating said bulbs one at a time to render the symbols on said plates visible when viewed from the front of said stack through the intervening plates.

4. A readout device comprising a stack of thin transparent plates lying in face-to-face relationship, each of said plates having the outline of a symbol scribed on the back surface thereof and a plurality of holes arranged on the border thereof which are aligned with similar holes in the other plates; a reflective coating on the outer edges of the plates and on the edges of all the holes of a plate except one hole thereof; a base having a plurality of tubular supports fixed normal to the surface thereof and spaced in accordance with the aligned holes in said stack; and a plurality of elongated bulbs, one secured to the end of each of said tubular supports, each of said bulbs being coated with an opaque material such that light can escape only through a small transparent area on the surface thereof, and each of said tubular supports being of different length such that upon inserting them into the aligned holes in said stack each of the bulbs has its transparent area positioned in the uncoated hole of a different plate.

5. A readout device comprising a stack of thin transparent plates lying in face-to-face relationship, each of said plates having the outline of a symbol scribed on the back surface thereof and a plurality of openings arranged on the border thereof which are aligned with similar openings in the other plates; a reflective coating on the outer edges of the plates and on the edges of all the openings of a plate except one opening thereof; a base having a plurality of tubular supports fixed normal to the surface thereof and spaced in accordance with the aligned openings in said stack; a plurality of elongated bulbs secured to the end of each of said tubular supports, each of said bulbs being coated such that light can escape only through a small transparent area on the surface thereof, and each of said tubular supports being of different length such that upon insertion into the aligned openings in said stack each of the bulbs has its transparent area positioned in the uncoated opening of a different plate; a mask positioned on the front of the stack for covering up the openings in the front of said stack so as to form, together with the base which covers up the openings in the back of said stack, a closed light chamber for each of said bulbs; and means for individually energizing said bulbs to render the symbols on said plates visible when viewed from the front of said stack.

6. A visual readout device comprising a plurality of transparent plates, each of said plates having a symbol scribed thereon in the same general area and a plurality of holes therein adjacent the area of the symbol and in substantial alignment with the holes in the other plates, to thereby provide openings through the plates, an electric illuminating element for each opening, means for directing light rays from each one of said elements into one of the holes of a different plate, said last named means comprising supporting and positioning each one of said elements a predetermined distance in a selected one of the openings.

References Cited in the file of this patent

UNITED STATES PATENTS

| | | |
|---|---|---|
| 2,082,724 | Shelor | June 1, 1937 |
| 2,446,674 | Sproul | Aug. 10, 1948 |
| 2,566,026 | Hughes | Aug. 28, 1951 |
| 2,594,081 | Shlenker | Apr. 22, 1952 |